United States Patent
Beach et al.

(10) Patent No.: US 8,775,277 B2
(45) Date of Patent: Jul. 8, 2014

(54) METHOD, SYSTEM, AND PROGRAM PRODUCT FOR ELECTRONICALLY VALIDATING INVOICES

(75) Inventors: Lorrie K. Beach, Greene, NY (US);
Denise L. Conrad, Endwell, NY (US);
Craig C. Cornell, Hartford, CT (US);
Lisa C. Fekler, Endicott, NY (US);
Scotty J. Reynolds, Binghamton, NY (US)

(73) Assignee: International Business Machines Corporation, Armonk, NY (US)

( * ) Notice: Subject to any disclaimer, the term of this patent is extended or adjusted under 35 U.S.C. 154(b) by 1586 days.

(21) Appl. No.: 11/408,913

(22) Filed: Apr. 21, 2006

(65) Prior Publication Data

US 2007/0250416 A1    Oct. 25, 2007

(51) Int. Cl.
*G06Q 40/00*    (2012.01)

(52) U.S. Cl.
USPC ............................................... 705/28; 705/35

(58) Field of Classification Search
USPC ...................................................... 705/26–28
See application file for complete search history.

(56) References Cited

U.S. PATENT DOCUMENTS

| | | | |
|---|---|---|---|
| 6,233,583 B1 | 5/2001 | Hoth | |
| 6,442,714 B1 | 8/2002 | Griffin et al. | |
| 6,507,826 B1 * | 1/2003 | Maners | 705/34 |
| 6,546,373 B1 | 4/2003 | Cerra | |
| 6,968,316 B1 | 11/2005 | Hamilton | |
| 6,968,319 B1 | 11/2005 | Remington et al. | |
| 7,100,195 B1 | 8/2006 | Underwood | |
| 7,206,768 B1 * | 4/2007 | deGroeve et al. | 705/54 |
| 7,693,760 B1 | 4/2010 | Fiteni et al. | |
| 2001/0018672 A1 * | 8/2001 | Petters et al. | 705/26 |
| 2002/0154125 A1 | 10/2002 | Coleman et al. | |
| 2002/0184125 A1 * | 12/2002 | Cirulli et al. | 705/35 |
| 2003/0105687 A1 | 6/2003 | Bross et al. | |
| 2004/0002906 A1 | 1/2004 | Von Drehnen et al. | |
| 2004/0049437 A1 * | 3/2004 | Brikman et al. | 705/31 |
| 2004/0068452 A1 | 4/2004 | Ullrich et al. | |
| 2004/0117305 A1 | 6/2004 | Meier et al. | |

(Continued)

FOREIGN PATENT DOCUMENTS

WO    2006026418 A2    3/2006

OTHER PUBLICATIONS

Mullins et al., U.S. Appl. No. 11/932,055, filed Oct. 31, 2007, Office Action dated Nov. 6, 2009, 16 pages.

(Continued)

*Primary Examiner* — Garcia Ade
(74) *Attorney, Agent, or Firm* — John Pivnichny; Hoffman Warnick LLC

(57) ABSTRACT

The present invention provides a method, system, and program product for validating invoices for transactions between trading partners that occur across jurisdictional borders such as inter-country or inter-state transactions. Specifically, under the present invention, an invoice corresponding to a transaction between trading partners is electronically received for instance in an invoice processing system. Upon receipt, a purchaser tax jurisdiction and a seller tax jurisdiction corresponding to the transaction will be determined. Based on these jurisdictions and a set of categorization rules, a category of the transaction is determined. Using the category and a set of validation rules, a tax rate indicated on the invoice and other optional aspects, such as whether the invoice contains all required information will be validated. Based on this validation it will be determined whether the overall invoice is valid or invalid.

24 Claims, 7 Drawing Sheets

(56) References Cited

U.S. PATENT DOCUMENTS

| | | |
|---|---|---|
| 2004/0267620 A1 | 12/2004 | Feldman et al. |
| 2005/0010575 A1 | 1/2005 | Pennington |
| 2005/0015360 A1 | 1/2005 | Cras et al. |
| 2005/0015390 A1 | 1/2005 | Uy et al. |
| 2005/0043998 A1 | 2/2005 | Bross et al. |
| 2005/0261967 A1 | 11/2005 | Barry et al. |
| 2005/0278233 A1* | 12/2005 | Bross et al. .............. 705/31 |
| 2007/0250416 A1 | 10/2007 | Beach et al. |
| 2009/0112743 A1 | 4/2009 | Mullins et al. |

OTHER PUBLICATIONS

Iwarere, Office Action Communication for U.S. Appl. No. 11/932,055 dated Jun. 23, 2011, 14 pages.

Iwarere, Office Action Communication for U.S. Appl. No. 11/932,055 dated Jan. 4, 2012, 10 pages.

Mullins et al., U.S. Appl. No. 11/932,055, filed Oct. 31, 2007, Office Communication dated Jun. 1, 2010, 10 pages.

* cited by examiner

| | | | | | | |
|---|---|---|---|---|---|---|
| CLIENT | 100 | 100 | 100 | 100 | 100 | 100 |
| COMPANY CODE | 8340 | 8340 | 8340 | 8340 | 8340 | |
| ELECTRONIC INVOICE NUMBER | A 0 | B 0 | A 1 | B 1 | A 2 | B 2 |
| VALIDATION RULE ID | SINGAPORE_GREATER_THAN_ZERO_WOI | SINGAPORE_>ZERO_GST_EDI | SINGAPORE_NOTAXABLE_WOI | SINGAPORE_NOTAXABLE_EDI | EU_SHIFT_TO_NONEU_WOI | EU_SHIFT_TO_NONEU_EDI |
| VATIN PO | | | | | | |
| SUPPVAT ON INVOICE | N | N | N | N | Y | Y |
| VAT ON INVOICE | N | N | N | | N | N |
| VAT CNTRY EQ | | | | | | |
| VAT CNTRY NE | | | | | | |
| SUP CNTRY EU | | | | | N | N |
| PUR CNTRY EU | N | N | | N | N | Y |
| PUR CNTRY NE | | | | | | |
| PUR CNTRY EO | SG | SG | SG | SG | SG | SG |
| Z53 IS TAXED | Y | Y | N | N | N | N |
| DEL CNTRY VR | N | N | | | | |
| SUPP CNTRY VR | | | | | | |
| SUPP CNTRY NE | | | | | N | |
| SUPP CNTRY EO | | | | | | |
| TOOL OVERRIDE | X | X | X | X | X | X |

FIG. 4

| CLIENT | COMPANY CODE | SENDER PORT | VALIDATE RULE ID | SUPPLIER TAX COUNTRY | PURCHASING TAX COUNTRY | TAX CODE | TAX RATE | OVERRIDE INDICATOR | PMNT BLOCK |
|---|---|---|---|---|---|---|---|---|---|
| 100 | 8340 | XMLHUB | EU_DOMESTIC_WOI | HU | HU | VA | 0 | X | |
| 100 | 8340 | SAP8I0 | EU_DOMESTIC_EDI | GB | GB | VI | 17 | X | |
| 100 | 8340 | XMLHUB | EU_DOMESTIC_WOI | GB | GB | VI | 0.17 | X | |
| 100 | 8340 | SAP8I0 | EU_DOMESTIC_EDI | IT | IT | NT | 20 | X | |
| 100 | 8340 | XMLHUB | EU_DOMESTIC_WOI | IT | IT | NT | 0.20 | X | |
| 100 | 8340 | SAP8I0 | EU_DOMESTIC_EDI | NL | NL | V3 | 0.19 | X | |
| 100 | 8340 | SAP8I0 | EU_DOMESTIC_EDI | NL | NL | V3 | 19.00 | X | |
| 100 | 8340 | SAP8I0 | EU_INTRACOMMUNITY_EDI | | HU | M5 | 0 | X | |
| 100 | 8340 | SAP8I0 | EU_INTRACOMMUNITY_EDI | | GB | M5 | 0 | X | |
| 100 | 8340 | SAP8I0 | EU_INTRACOMMUNITY_EDI | | | M5 | 0 | X | |
| 100 | 8340 | XMLHUB | NONEU_VATREG_DOMESTIC | ZA | ZA | XX | 0.14 | X | |
| 100 | 8340 | XMLHUB | NONEU_VATREG_DOMESTIC | NO | NO | YY | 0.11 | X | |
| 100 | 8340 | XMLHUB | NONEU_VATREG_DOMESTIC | CH | CH | ZZ | 0.09 | X | |
| 100 | 8340 | SAP8I0 | SINGAPORE>ZERO_GST_EDI | SG | | P5 | 0.05 | X | |
| 100 | 8340 | SAP8I0 | SINGAPORE>ZERO_GST_EDI | SG | | P4 | 0.04 | X | |
| 100 | 8340 | SAP8I0 | SINGAPORE>ZERO_GST_EDI | SG | | P1 | 0.03 | X | |
| 100 | 8340 | SAP8I0 | SINGAPORE_NONTAXABLE_EDI | SG | | P0 | 0 | X | |
| 100 | 8340 | SAP8I0 | SINGAPORE_NONTAXABLE_EDI | SG | | P2PM | | | X |

FIG. 6

| VALIDATION TO PERFORM | EU_DOMESTIC | EU_INTRA_COMMUNITY | EU_IMPORT_FROM_NONEU_NONWATREG | NONEU_VATREG_DOMESTIC | NON EU | SINGAPORE > 0 GST INVOICE |
|---|---|---|---|---|---|---|
| SUPPLIER COMPANY NAME | X | X | | | | X |
| SUPPLIER STREET ADDRESS | X | X | | | | X |
| SUPPLIER CITY | X | X | | | | X |
| SUPPLIER COUNTRY | X | X | | | | X |
| "BILL TO" COMPANY NAME | X | X | | | | X |
| "BILL TO" COMPANY PART NUMBER | X | X | | | | X |
| SUPPLIER GST REGISTRATION NUMBER | X | X | | | | X |
| EDI253 TAX RATE | X | X | | | | X |
| INVOICE EXCHANGE RATE | X | | | | | X |
| INVOICE AMOUNT BEFORE TAX (DOC_CURR) | X | | | | | X |
| INVOICE AMOUNT BEFORE TAX (LOC_CURR) | X | | | | | X |
| INVOICE AMOUNT AFTER TAX (DOC_CURR) | | | | | | X |
| INVOICE AMOUNT AFTER TAX (LOC_CURR) | | | | | | X |
| SUPPLIER VAT REGISTRATION NUMBER EXISTS ON INVOICE E2EDK02-906 | X | X | | X | | |
| BUYING COMPANY VAT REGISTRATION NUMBER EXISTS ON INVOICE E2EDK02-909 | X | X | | X | | |
| SUPPLIER SECOND VAT REGISRATION NUMBER EXISTS ON INVOICE .*: THIS WILL BE A SECOND E2EDK02-BELNR WITH QUALIFIER OF 906 | | | | | | |
| TAX POINT DATE | X | X | | | | |
| "SHIP TO" COMPANY NAME | X | X | | | | |
| "SHIP TO" STREET ADDRESS | X | X | | | | |

*FIG. 7*

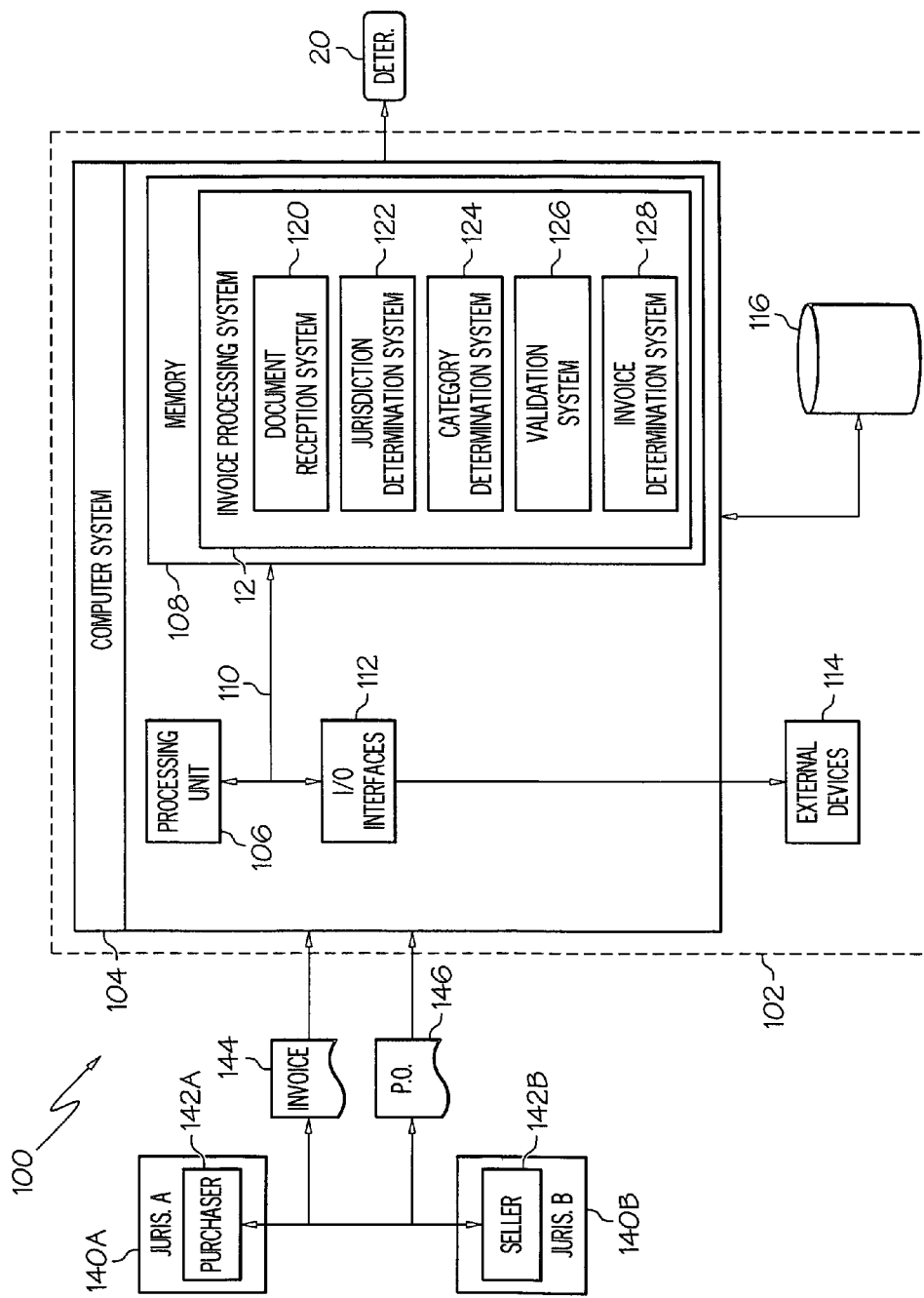

METHOD, SYSTEM, AND PROGRAM PRODUCT FOR ELECTRONICALLY VALIDATING INVOICES

FIELD OF THE INVENTION

The present invention generally relates to a method, system, and program product for electronically validating invoices (e.g., across jurisdictions). Specifically, the present invention provides an automated way to validate, among other things, a tax rate (e.g., value added tax rate) set forth on the invoice.

BACKGROUND OF THE INVENTION

In business, it is common for taxes on the sales of goods or services to be imposed. One specific type of tax that is commonly imposed is known as a Value Added Tax (VAT), which functions similar to a sales tax in that it is levied at the time of the sale of the goods or services. In some jurisdictions, including Australia, Canada, New Zealand, and Singapore, this tax is known as "goods and services tax" or GST; and in Japan it is known as "consumption tax". VAT is an indirect tax, in that the tax is collected from someone other than the person who actually bears the cost of the tax (i.e., namely the seller/seller rather than the consumer).

In general, businesses are permitted to recover a VAT on the materials and services that they buy to make further supplies or services that are directly or indirectly sold to end-users. In this way, the total tax levied at each stage in the economic chain of supply is a constant fraction of the value added by a business to its products, and most of the cost of collecting the tax is borne by business, rather than by the state. The VAT was invented because very high sales taxes and tariffs encourage cheating and smuggling. A common VAT system is compulsory for member states of the European Union (EU). The EU VAT system is imposed by a series of European Union directives.

Unfortunately, there are currently many difficulties when it comes to validating invoices to ensure that the proper VAT has been levied. For example, a company that is VAT registered in multiple EU member states, or in non-EU jurisdictions with a VAT regime, needs a system with capabilities to perform electronic invoicing with multiple VAT regimes rather than one VAT regime. Currently, available (e.g., SAP) systems allows only one VAT registration number to be configured per company code. This limits the flexibility for electronic invoicing for a company that is VAT registered in multiple jurisdictions other than its' resident country. In addition, non-EU entities may acquire EU VAT registration numbers in one or more EU member states, and may therefore be treated as EU entities for VAT purposes. However, current systems do not allow for non-EU entities that have acquired VAT registration numbers to have the VAT registration numbers configured in a company code. This limits electronic invoicing capability for this entity to non-EU non-VAT invoice transactions. Still yet, a business entity could receive electronic invoices from a worldwide seller base where goods transferred between various jurisdictions that have differing tax laws governing electronic invoicing. Although the business entity is located in one country, the business entity may be VAT registered in multiple jurisdictions. As such, each country's tax law requirements and validations must be applied to the incoming invoice as appropriate.

The current solution to ensure proper tax treatment on invoices is to process paper invoices manually. Such a process has many drawbacks including personnel cost, the potential for human error, the lack of tax treatment knowledge for various jurisdictions, increased risk that proper tax treatment may not be applied consistently, and hardcopy invoice storage cost.

In view of the foregoing, there exists a need for an automated system for validating invoices (e.g., and the tax rates therein) that solves at least one of the deficiencies in the existing art.

SUMMARY OF THE INVENTION

The present invention provides a method, system, and program product for validating invoices for transactions between trading partners that occur across jurisdictional borders (e.g., inter-country or inter-state transactions). Specifically, under the present invention, an invoice corresponding to a transaction between trading partners (e.g., a purchaser and a seller) is electronically received (e.g., in an invoice processing system). Upon receipt, a purchaser tax jurisdiction (e.g., a first country) and a seller tax jurisdiction (e.g., a second country) for the transaction will be determined. Based on these jurisdictions and a set of categorization rules, a category of the transaction is determined. Using the category and a set of validation rules, a tax rate indicated on the invoice and other optional aspects (e.g., whether the invoice contains all required information) will be validated. Based on this validation it will be determined whether the overall invoice is valid or invalid.

A first aspect of the present invention provides a method for electronically validating invoices, comprising: electronically receiving an invoice corresponding to a transaction between a purchaser and a seller; determining a purchaser tax jurisdiction and a seller tax jurisdiction for the transaction; determining a category of the transaction based on the purchaser tax jurisdiction, the seller tax jurisdiction, and a set of categorization rules; validating a tax rate indicated on the invoice based on the category and a set of validation rules; and determining whether the invoice is valid based on the validating.

A second aspect of the present invention provides a system for electronically validating invoices, comprising: a document reception system for electronically receiving an invoice corresponding to a transaction between a purchaser and a seller; a jurisdiction determination system for determining a purchaser tax jurisdiction and a seller tax jurisdiction for the transaction; a category determination system for determining a category of the transaction based on the purchaser tax jurisdiction, the seller tax jurisdiction, and a set of categorization rules; a validation system for validating a tax rate indicated on the invoice based on the category and a set of validation rules; and an invoice determination system for determining whether the invoice is valid based on a result of the validation system.

A third aspect of the present invention provides a program product stored on a computer readable medium for electronically validating invoices, the computer readable medium comprising program code for causing a computer system to perform the following steps: electronically receiving an invoice corresponding to a transaction between a purchaser and a seller; determining a purchaser tax jurisdiction and a seller tax jurisdiction for the transaction; determining a category of the transaction based on the purchaser tax jurisdiction, the seller tax jurisdiction, and a set of categorization rules; validating a tax rate indicated on the invoice based on the category and a set of validation rules; and determining whether the invoice is valid based on the validating.

A fourth aspect of the present invention provides a method for deploying an application for electronically validating invoices, comprising: providing a computer infrastructure being operable to: electronically receive an invoice corresponding to a transaction between a purchaser and a seller; determine a purchaser tax jurisdiction and a seller tax jurisdiction for the transaction; determine a category of the transaction based on the purchaser tax jurisdiction, the seller tax jurisdiction, and a set of categorization rules; validate a tax rate indicated on the invoice based on the category and a set of validation rules; and determine whether the invoice is valid based on the validating.

A fifth aspect of the present invention provides computer software embodied in a propagated signal for electronically validating invoices, the computer software comprising instructions for causing a computer system to perform the following steps: electronically receiving an invoice corresponding to a transaction between a purchaser and a seller; determining a purchaser tax jurisdiction and a seller tax jurisdiction for the transaction; determining a category of the transaction based on the purchaser tax jurisdiction, the seller tax jurisdiction, and a set of categorization rules; validating a tax rate indicated on the invoice based on the category and a set of validation rules; and determining whether the invoice is valid based on the validating.

A sixth aspect of the present invention provides a business method for electronically validating invoices.

Therefore, the present invention provides a method, system, and program product for electronically validating invoices

BRIEF DESCRIPTION OF THE DRAWINGS

These and other features of this invention will be more readily understood from the following detailed description of the various aspects of the invention taken in conjunction with the accompanying drawings that depict various embodiments of the invention, in which:

FIG. 4 depicts an illustrative categorization rules table according to the present invention.

FIG. 6 depicts an illustrative tax code table according to the present invention.

FIG. 7 depicts an illustrative validation rules table according to the present invention.

FIG. 8 depicts a more specific computerized implementation of the present invention.

It is noted that the drawings of the invention are not to scale. The drawings are intended to depict only typical aspects of the invention, and therefore should not be considered as limiting the scope of the invention. In the drawings, like numbering represents like elements between the drawings.

BEST MODE FOR CARRYING OUT THE INVENTION

Figure 1:
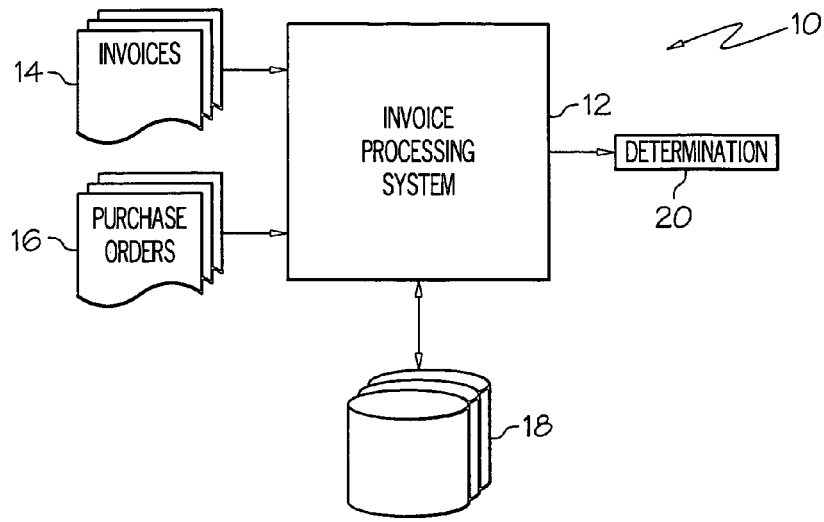
FIG. 1 depicts an invoice processing system according to the present invention.

For convenience, the Best Mode for Carrying out the Invention has the following sections:
I. General Description
A. European Union (EU) VAT Background
II. Illustrative Embodiment
A. Jurisdiction Determination
B. Categorization
C. Validation
III. Computerized Implementation I. General Description As indicated above, the present invention provides a method, system, and program product for validating invoices for transactions between trading partners that occur across jurisdictional borders (e.g., inter-country or inter-state transactions). Specifically, under the present invention, an invoice corresponding to a transaction between trading partners (e.g., a purchaser and a seller) is electronically received (e.g., in an invoice processing system). Upon receipt, a purchaser tax jurisdiction (e.g., a first country) and a seller tax jurisdiction (e.g., a second country) corresponding to the transaction will be determined. Based on these jurisdictions and a set of categorization rules, a category of the transaction is determined. Using the category and a set of validation rules, a tax rate indicated on the invoice and other optional aspects (e.g., whether the invoice contains all required information) will be validated. Based on this validation it will be determined whether the overall invoice is valid or invalid.

A. European Union (EU) VAT Background

It should be understood in advance that an illustrative embodiment of the present invention set forth in Section II below involves the computerized/automated validation of an EU VAT rate indicated on an invoice. As such, some background information for the EU VAT system is given in this section. It should be appreciated, however, that the present invention is not limited to validating an EU VAT rate. For example, the present invention could be implemented to validate any type of tax rate for any jurisdiction.

Under the EU system of VAT, where a person carrying on an economic activity supplies goods and services to another person, and the value of the supplies passes financial limits, the seller is required to: register with the local taxation authorities and charge its customers; and account to the local taxation authority for VAT (although the price may be inclusive of VAT, so VAT is included as part of the agreed price, or exclusive of VAT, so VAT is payable in addition to the agreed price). VAT that is charged by a business and paid by its customers is known as output VAT (i.e., VAT on its output supplies). VAT that is paid by a business to other businesses on the supplies that it receives is known as input VAT (i.e., VAT on its input supplies). A business is generally able to recover input VAT to the extent that the input VAT is attributable to (i.e., used to make) its taxable outputs. Input VAT is recovered by setting it against the output VAT for which the business is required to account to the government, or, if there is an excess, by claiming a repayment from the government.

Different rates of VAT apply in different EU member states. The minimum standard rate of VAT throughout the EU is currently 15%, although reduced rates of VAT, as low as 5%, are applied in various states on various sorts of supply (e.g., domestic fuel and power in the UK). The maximum rate in the EU is 25%.

The EU VAT system is generally governed by a set of VAT Directives. The Sixth VAT Directive requires certain goods and services to be exempt from VAT (e.g., postal services, medical care, lending, insurance, betting), and certain other goods and services to be exempt from VAT but subject to the ability of an EU member state to opt to charge VAT on those supplies (such as land and certain financial services). Input VAT that is attributable to exempt supplies is not recoverable; although a business can increase its prices so the customer effectively bears the cost of the "sticking" VAT (the effective rate will be lower than the headline rate and depend on the balance between previously taxed input and labor at the exempt stage).

In addition, some goods and services are "zero-rated". The zero-rate is a positive rate of tax calculated at 0%. Supplies subject to the zero-rate are still "taxable supplies", i.e. they have VAT charged on them. In the UK, examples include most food, books, drugs, and certain kinds of transport. The zero-rate is not featured in the EU Sixth Directive as it was intended that the minimum VAT rate throughout Europe would be 5%. However zero-rating remains in some Member States, most notably the UK, as a legacy of pre-EU legislation. These Member States have been granted a derogation to continue existing zero-rating but cannot add new goods or services.

When goods are imported into the EU from other states, VAT is generally charged at the border, at the same time as customs duty. "Acquisition" VAT is payable when goods are acquired in one EU member state from another EU member state (this is done not at the border but through an accounting mechanism). EU businesses are often required to charge themselves VAT under the reverse charge mechanism where services are received from another member state or from outside of the EU.

Businesses can be required to register for VAT in EU member states, other than the one in which they are based, if they supply goods via mail order to those states, over a certain threshold. Businesses that are established in one member state but which receive supplies in another member state may be able to reclaim VAT charged in the second state under the provisions of the Eighth VAT Directive (Directive 79/1072/EC). A similar directive, the Thirteenth VAT Directive (Directive 86/560/EC), also allows businesses established outside the EU to recover VAT in certain circumstances.

VAT differs from a conventional sales tax in that VAT is levied on every business as a fraction of the price of each taxable sale they make, but they are in turn reimbursed VAT on their purchases, so the VAT is applied to the value added to the goods at each stage of production. Sales taxes are normally only charged on final sales to consumers: because of reimbursement, VAT has the same overall economic effect on final prices. One main difference is the extra accounting required by those in the middle of the supply chain; this disadvantage of VAT is balanced by application of the same tax to each member of the production chain regardless of its position in it and the position of its customers, reducing the effort required to check and certify their status. When the VAT has few, if any exemptions such as with GST in New Zealand, payment of VAT can be even simpler.

II. Illustrative Example

As indicated above, in a typical embodiment, the present invention can be used to validate that VAT rates and other information is correct and/or included on invoices that correspond to a transaction between trading partners. Referring now to FIG. 1, an architectural diagram 10 depicting an invoice processing system 12 of the present invention is shown. Under the present invention, invoice processing system 12 will electronically receive invoices 14 and (optionally) purchase orders 16 that pertain to the transaction between the trading partners. In a typical embodiment, invoice processing system 12 can be implemented as part of, or can operate in conjunction with an SAP system. Regardless, using information contained in invoices 14 and the optional purchase orders 16, invoice processing system 12 will leverage a set of rules 18 to perform tax rate and other validations of invoices 14 and output the resulting determination(s) 20. This process generally includes the following steps: determining the purchaser and seller tax jurisdictions for the transaction/invoice, determining a category of the transaction/invoice based on the determined jurisdictions and a set of categorization rules, validating a tax rate and other components of the transaction/invoice based the category and a set of validation rules, and determining whether the invoice is valid based on the success of the validation(s).

A. Country Determination

Figure 2:
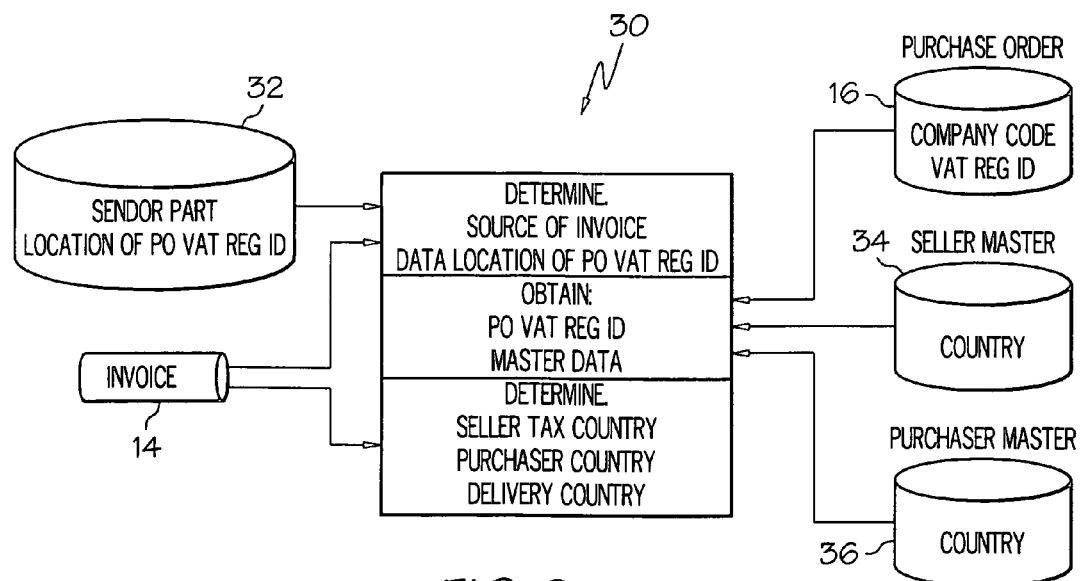
FIG. 2 depicts an architectural diagram showing a determination of a purchaser tax jurisdiction and a seller tax jurisdiction according to the present invention.

Referring now to FIG. 2, an architectural diagram 30 depicting the determination of purchaser tax jurisdiction and a seller tax jurisdiction under the present invention is shown. Under the present invention, the seller tax jurisdiction is determined by examining the seller's VAT registration number, which includes a two-character ISO country code prefix for the seller, in the incoming electronic invoice 14. The purchaser tax jurisdiction can be determined in multiple ways. In one embodiment, the purchaser tax jurisdiction is determined by examining the purchaser's VAT registration number, which includes a two-character ISO country code prefix for the purchaser, in invoice 14. In another embodiment, locator information 32 is used to locate a purchase order 16 corresponding to the transaction/invoice. The purchaser's VAT registration number can be located in purchase order 16, and then examined to determine the purchaser tax jurisdiction (e.g., from the two digit country code prefix). In this embodiment, the purchaser's VAT registration number could be located in a header or a item of purchase order 16.

Shown below are logical rules for determining the purchaser tax jurisdiction and seller tax jurisdiction as indicated above:

Rules for Determining Seller Tax Jurisdiction:

(1) ISO country code of E2EDK02-BLENR with qualifier 906—If blank proceed to step 2

**Note, when first two positions of the seller VAT registration number in e2edk02-belnr (906) is 'EL' then ISO country should be stored as 'GR'

(2) ISO country code of E2EDK02-916—If blank proceed to step 3

(3) LFA1-LAND1 of seller on invoice 14. (Resident country of seller used as default)

Rules for Determining Purchaser Tax Jurisdiction:

When derived from purchase order16 (i.e., when PVAT selected from PO Header or PVAT from PO Item [pur vat loc=A or B is selected]):

(1) ISO country code of EDI_Z50-INC01 (sent by WOI only for EU sellers doing business with SG)—If blank proceed to step 2

(2) ISO Country of VAT Registration Number on the PO (EKKO-ZZVATNUM)—unless ZZR01A-T001 over is 'X' and Seller tax jurisdiction is EU OR if EKKO-ZZVATNUM is blank→proceed to step 3

**Note, when first two positions of the VAT registration number in EKKO-ZZVATNUM is 'EL' then ISO country should be stored as 'GR'

(3) T001-LAND1 (the country of the company code)

When derived from invoice 14 [pur vat loc=C is selected]:

(1) ISO country code of EDI_Z50-INC01 (sent by WOI only for EU sellers doing business with SG)—If blank proceed to step 2

(2) ISO Country of VAT Registration Number on Invoice (E2EDK02-909)

**Note, when first two positions of the VAT registration number in EKKO-ZZVATNUM is 'EL' then ISO country should be stored as 'GR'

(3) T001-LAND1 (the country of the company code)

Also shown in FIG. 2 are seller master data 34 and purchaser master data 36. These data sets can be used to confirm the purchaser and seller tax jurisdictions as well as to determine a delivery country.

B. Categorization

Figure 3:
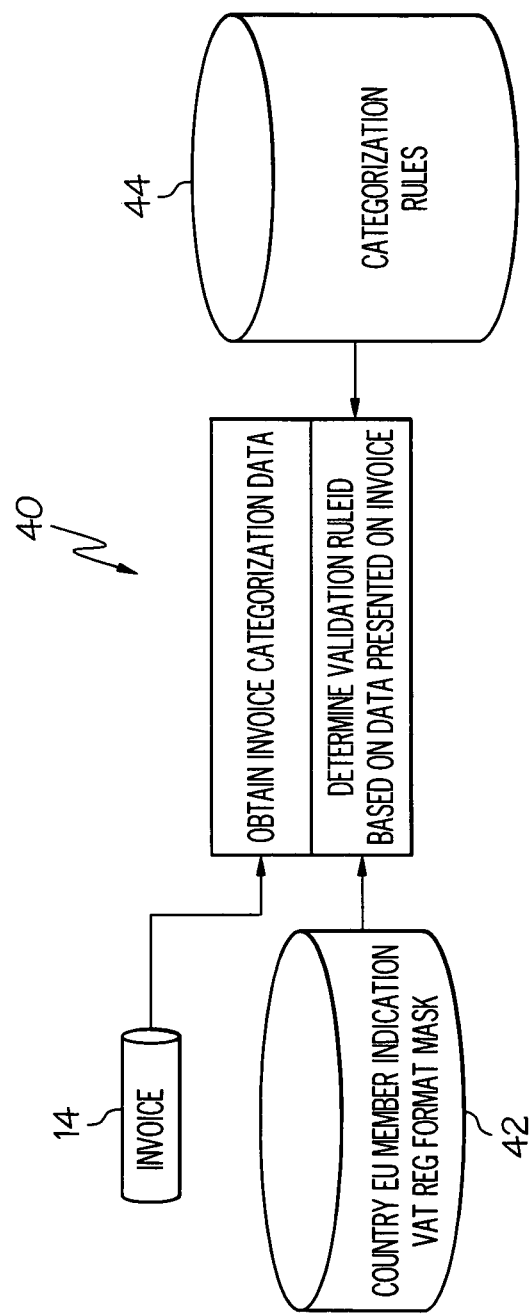
FIG. 3 depicts an architectural diagram showing a categorization of an invoice according to the present invention.

Once the purchaser tax jurisdiction and a seller tax jurisdiction have been determined, the invoice processing system will use the same against a set of categorization rules to determine a category of transaction/invoice 14. Referring to FIG. 3, an architectural diagram 40 of this process is shown. As depicted, country member indicators (e.g., as extracted as indicated above) will be utilized against a set of categorization rules 44 to categorize invoice 14. Shown below are examples of categories under which invoice 14 may fall:

(1) EU Domestic: Seller tax jurisdiction and purchaser tax jurisdiction are the same EU member country. Example→ES-ES (Spain), GB-GB (Great Britain), DE-DE (Germany), FR-FR (France), etc.

2) EU Intra community: Seller tax jurisdiction and purchaser tax jurisdiction are different EU member jurisdictions. Example→ES-GB (Spain→Great Britain), GB-FR (Great Britain→France), DE-ES (Germany→Spain), FR-IE (France→Ireland), etc.

(3) EU Import from Non-EU Non-VAT Registered Country Category: Seller tax jurisdiction is not an EU member country and is not a VAT registered country. Purchaser tax jurisdiction is an EU member country. Example→NL buying from US, Mongolia, Taiwan, Canada, Japan, etc.

(4) EU Import from Non-EU VAT Registered Country Category: Seller tax jurisdiction is not an EU member country but is a VAT registered country. Purchaser tax jurisdiction is an EU member country. Example→NL buying from South Africa, Norway, Switzerland.

(5) Non-EU Domestic VAT Category: Seller tax jurisdiction and purchaser tax jurisdiction are the same VAT registered country, but is not an EU member country. Example→ZA-ZA (South Africa), CH-CH (Switzerland), NO-NO (Norway)

(6) Non EU General Category: Seller tax jurisdiction can be any country and purchaser tax jurisdiction is not an EU member country and is not a VAT registered country. Example→US-US, US-CA, TW-TW, CA-JP, CA-US, CA-CA, SG-SG, SG-US, and US-NL.

For Singapore company codes, the Non-EU general category is replaced by Singapore Nontaxable GST and Singapore Greater than Zero GST invoice categories.

(7) Singapore Non-taxable GST invoice: Nontaxable imports into Singapore to which the EU Directive does not apply. No additional Singapore taxation laws apply.

(8) Singapore Greater than 0 GST invoice: Goods and Services taxable invoice. Domestic Singapore activity to which additional Singapore taxation laws must be applied.

(9) EU Shift to Non-EU invoice: Intended transaction is for seller tax jurisdiction and purchaser tax jurisdiction to both be EU members. Seller makes an emergency shipment from outside the EU, thus the transaction shifts to a non-EU import. The actual seller tax jurisdiction shifts to a Non-EU country and the purchaser tax jurisdiction remains an EU member. Utilized for Singapore company codes.

In general, set of categorization rules 44 define the categories and can be provided in a truth table style (if-then) format. The invoice processing system will determine the most applicable category based on a best fit of data to set of categorization rules 44. Referring to FIG. 4, an illustrative table 50 of categorization rules is shown. The fields of table 50 have the following definitions/actions:

Company Code—enter the company code for which a rule needs to be defined

Electronic Invoice—select an invoice type to be used for the rule being defined

A—WOI invoices only

B—EDI invoices only

C—WOI or EDI invoices

X—FET invoices only

Z—Any type of invoice

Number—sequence number of the rule. The order in which the rules should be searched.

Validation Rule ID—the name of the rule being created.

Vat on PO—does the purchasing company VAT registration number exist on the purchase order, Y or N or leave blank if could be either Y or N.

SuppVAT on Invoice—does the seller VAT registration number exist on invoice 14, Y or N or leave blank if could be either Y or N.

VAT on Invoice—does the purchasing company VAT registration number exist on invoice 14, Y or N or leave blank if could be either Y or N.

VAT Cntry EQ—are the ISO country codes of the purchaser and seller VAT. Registration numbers on invoice 14 equal, Y or N or leave blank if could be either Y or N.

VAT Cntry NE—are the ISO country codes of the and seller VAT registration numbers on invoice 14 NOT equal, Y or N or leave blank if could be either Y or N.

Sup Cntry EU—is the seller tax jurisdiction an EU member, Y or N or leave blank if could be either Y or N.

Pur Cntry EU—is the purchaser tax jurisdiction an EU member, Y or N or leave blank if could be either Y or N.

Pur Cntry NE—the purchaser tax jurisdiction is NOT equal to XX—enter an ISO country code (i.e., SG or FR etc) or leave blank.

Pur Cntry EQ—the purchaser tax jurisdiction is equal to XX—enter an ISO country code (i.e., SG or FR etc.).

Z53 is taxed—The EDI-Z53segment on the invoice is taxed, Y or N or leave blank if could be either Y or N Y—If Either 1) tax Rate>zero OR 2) tax Amount>zero. Otherwise N or leave blank.

Del Cntry VR—is the delivery country VAT Registered, Y or N or leave blank if could be either Y or N. The delivery country from invoice 14 delivery address is checked for a match in ZVATC.

Supp Cntry VR—is the seller tax jurisdiction VAT Registered, Y or N or leave blank if could be either Y or N. The seller tax jurisdiction from the invoice or default of LFA1-LAND1 is checked for a match in ZVATC.

Supp Cntry NE—the seller tax jurisdiction is NOT equal to XX—enter an ISO country code (i.e., SG or FR etc) or leave blank.

Supp Cntry EQ—the seller tax jurisdiction is equal to XX—enter an ISO country code (i.e., SG or FR etc) or leave blank.

T001 override—T001-LAND1 overrides Purchase Order VAT Country for validation. X or blank. Used for company codes where the resident country of the purchasing country is not a VAT registered country (i.e., Singapore).

C. Validation

Figure 5:
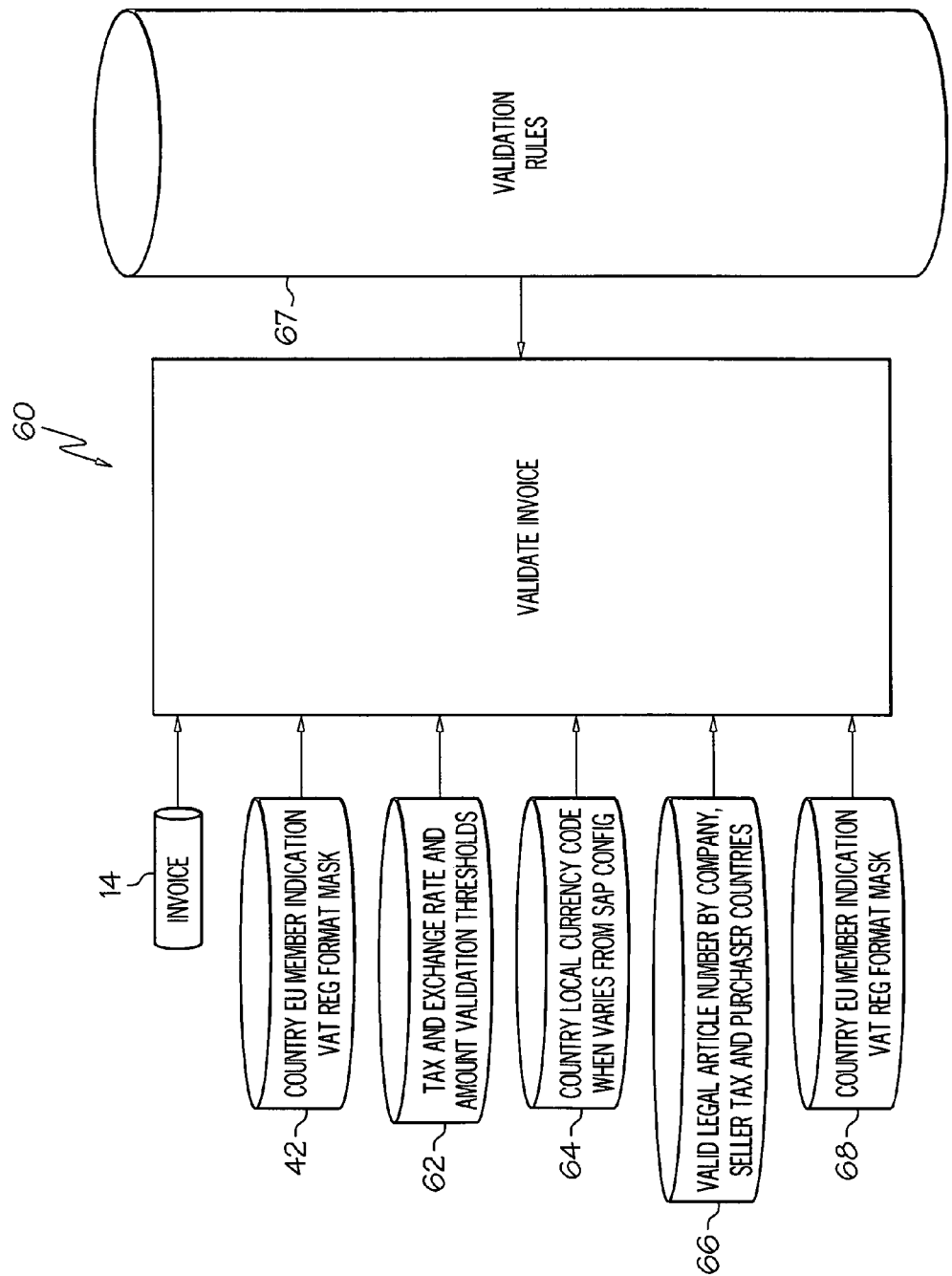
FIG. 5 depicts an architectural diagram showing a validation of an invoice according to the present invention.

Once the purchaser tax jurisdiction, seller tax jurisdiction, and category are known, the invoice processing system will use the same and a set of validation rules to validate the transaction/invoice. This validation generally involve validation of the VAT rate indicated therein, as well as other validations such as verifying that invoice 14 contains all required information/data. Referring now to FIG. 5, an architectural diagram 60 depicting the validation of invoice 14 is shown. As depicted, various pieces of information (some previously determined) will be leveraged by the invoice processing system against a set of validation rules 67 to validate invoice 14. Examples of such information shown in FIG. 5 include, the country code indicators (i.e., the purchaser and seller tax jurisdictions) 42, tax and exchange rate and amount validation thresholds 62, country local currency codes 64, legal article numbers 66, and valid reasons for zero VAT 68. These are intended as examples only and do not necessarily represent an exhaustive list.

In any event, set of validation rules 67 can set forth definitions and/or descriptions for leveraging this information to determine if the VAT rate indicated on the invoice is correct. To do this, the invoice processing system will typically attempt to compute the VAT rate and then compare it to what is indicated on invoice 14. In making this computation, the invoice processing system can also leverage the applicable tax codes.

Referring to FIG. 6, a table 70 used to determine the applicable tax code is shown. In determining the applicable tax code, the following procedure will be implemented by the invoice processing system:

(1) Validate that the tax rate the seller submitted on invoice 14 is a valid tax rate for the type of invoice that was submitted. Search table 50 for the row that matches the Client, Company Code, Sender Port, Valid Rule ID (Invoice Category that was assigned), seller tax jurisdiction, purchaser tax jurisdiction and tax Rate from invoice 14. If an exact match is not found, then automatically reject invoice 14 due to an invalid tax rate.

(2) Determine the tax code to place on invoice 14. Search table 50 for the row that matches the Client, Company Code, Sender Port, Valid Rule ID (Invoice Category that was assigned), seller tax jurisdiction, purchaser tax jurisdiction and tax Rate from invoice 14 to derive the tax code.

(3) Continue to check table 50 Override Indicator and Pmnt Block settings to post invoice with appropriate tax codes and amounts. Override Indicator of X means to post invoice 14 with the derived tax code even if it is different than the tax code that exists on the Purchase Order. Override Indicator of <blank> means do not override the purchase order tax code. Payment Block of X means to block the posted invoice for payment. Payment Block of <blank> means do not block the posted invoice for payment. Seller tax jurisdiction—enter the ISO country code or leave blank if applies to more than one country.

Purchaser tax jurisdiction—enter the ISO country code or leave blank if applies to more than one country.

In any event, these pieces of information will be used in conjunction with the set of validation rules to validate the invoice. As indicated above, this not only means verifying whether the VAT rate is correct, but it can also involve other validations such as verifying that all required information has been included in invoice 14. It should be noted, however, that one level of tax rate validation is performed in the tax code procedure outlined above.

Regardless, FIG. 7 depicts a table containing a set of validation rules. In general table 50 sets forth what pieces of information are required to be included on invoices by category.

(1) [SupName] Seller Company Name—
When Invoice category is 'X' for this validation, then:
Seller Company Name is required to exist in SAP segment E2EDKA1-NAME1 when E2EDKA1-PARRTN-PARVW is RS.

If it is not populated, reject invoice 14 with new error message (T100 Z0 message class):
'Seller Company Name is required on Invoice'

(2) [SupStrAddr] Seller Street Address—
When Invoice category is 'X' for this validation, then:
Seller Street Address is required to exist in SAP segment E2EDKA1-NAME3 or E2EDKA1-STRAS when E2EDKA1-PARRTN-PARVW is RS.
If it is not populated, reject invoice 14 with new error message (T100 Z0 message class): 'Seller Street Address is required on Invoice'

(3) [SuipCity] Seller City—
When Invoice category is 'X' for this validation, then:
Seller City is required to exist in SAP segment E2EDKA1-ORT01 when E2EDKA1-PARRTN-PARVW is RS.
If it is not populated, reject invoice 14 with new error message (T100 Z0 message class): 'Seller City is required on Invoice'

(4) [SupCntry] Seller Country—
When Invoice category is 'X' for this validation, then:
Seller Country is required to exist in SAP segment E2EDKA1-LAND1 when E2EDKA1-PARRTN-PARVW is RS.
If it is not populated, reject invoice 14 with new error message (T100 Z0 message class): 'Seller Country is required on Invoice'

(5) [BillToName] 'Bill To' Company Name—
When Invoice category is 'X' for this validation, then:
'Bill To' Company Name is required to exist in SAP segment E2EDKA1-NAME1 when E2EDKA1-PARRTN-PARVW is EK.
If it is not populated, reject invoice 14 with new error message (T100 Z0 message class):
'Bill To Company Name is required on Invoice'

(6) [BillToStrA] 'Bill To' Street Address—
When Invoice category is 'X' for this validation, then:
'Bill To' Street Address is required to exist in SAP segment E2EDKA1-STRAS when E2EDKA1-PARRTN-PARVW is EK.
If it is not populated, reject invoice 14 with new error message (T100 Z0 message class):
"Bill To' Company Street Address is required on Invoice'

(7) 'Bill To' City—When Invoice category is 'X' for this validation then:
'Bill To' City is required to exist in SAP segment E2EDKA1-ORT01 when E2EDKA1-PARRTN-PARVW is EK.
If it is not populated, reject invoice 14 with new error message (T100 Z0 message class): "Bill To' City is required on Invoice'

(8) 'Bill To' Country—When Invoice category is 'X' for this validation, then:
'Bill To' Country is required to exist in SAP segment E2EDKA1-LAND1 when E2EDKA1-PARRTN-PARVW is EK.
If it is not populated, reject invoice 14 with new error message (T100 Z0 message class): "Bill To' Country is required on Invoice'

(9) Buying Company Part Number—When Invoice category is 'X' for this validation, then:
Part Number is required to exist in SAP segment E2EDP19-IDTNR-qualifier 001.
If it is not populated, reject invoice 14 with new error message (T100 Z0 message class):
'Buying Company Part Number is required on GST Invoice'

(10) Seller GST registration number—When Invoice category is 'X' for this validation, then:

Seller GST registration number is required to exist in SAP segment E2EDK02-BELNR-GST.

If it is not populated, reject invoice 14 with new error message (T100 Z0 message class):

'Seller GST Registration Number is required on Invoice'

(11) EDI_Z53 Tax Rate—When Invoice category is 'X' for this validation, then:

Tax rate is required to exist in SAP segment EDI_Z53 MSATZ.

If it is not populated, reject invoice 14 with new error message (T100 Z0 message class): 'tax Rate is required on Invoice.'

(12) Invoice Exchange Rate—When Invoice category is 'X' for this validation, then:

Invoice Exchange Rate is required to exist in SAP segment E2EDK02-922 when invoice currency code < > purchasing country currency code.

If it is not populated, reject invoice 14 with new error message (T100 Z0 message class): 'Exchange rate is required on Invoice.'

(13) Invoice Amount Before Tax (in Document Currency)—When Invoice category is 'X' for this validation, then:

Invoice Amount Before tax (in Document Currency) is required to exist in SAP segment E2EDS01-010.

If it is not populated, reject invoice 14 with new error message (T100 Z0 message class):

'Invoice contains GST or VAT which requires invoice net amount quoted in & currency.'

Note: '&' is the document currency of invoice 14 [EDI_Z50-WAERK].

(14) Invoice Amount Before Tax (in Local Currency)—When Invoice category is 'X' for this validation, then:

Invoice Amount Before tax (in Local Currency) is required to exist in SAP segment E2EDS01-903 when invoice currency code < > purchasing country currency code.

If it is not populated, reject invoice 14 with new error message (T100 Z0 message class):

'Invoice contains GST or VAT which requires invoice net amount quoted in & currency.'

For transactions in categories 3, 5 & 6 (VAT registration number not on PO): '&' is the local currency of the purchasing country. (See table containing country and national local currency codes).

For transactions in categories 1, 2 & 4 (VAT registration number is on PO): '&' is the local currency of the seller tax jurisdiction (See table containing country and national local currency codes).

(15) Invoice Tax Amount (in Document Currency)—When Invoice category is 'X' for this validation, then:

Invoice tax Amount (in Document Currency) is required to exist in SAP segment E2EDS01-005 when taxable invoice.

If it is not populated, reject invoice 14 with new error message:

'Invoice contains GST or VAT which requires net tax amount quoted in & currency.'

Note: '&' is the document currency of invoice 14 [EDI_Z50-WAERK].

(16) Invoice Tax Amount (in Local Currency)—When Invoice category is 'X' for this validation, then:

Invoice tax Amount (in Local Currency) is required to exist in SAP segment E2EDS01-988 when taxable invoice, and invoice currency code < > purchasing country currency code.

**Note: there is some logic in the current Z810XXX0 code, but it needs to be capable of being flagged on or off at the transaction level and needs a little more modification than it currently has.

If it is not populated, reject invoice 14 with new error message (T100 Z0 message class):

'Invoice contains GST or VAT which requires net tax amount quoted in & currency.'

For transactions in categories 3, 5 & 6 (VAT registration number not on PO): is the local currency of the purchasing country. (See table containing country and national local currency codes).

For transactions in categories 1, 2 & 4 (VAT registration number is on PO): '&' is the local currency of the seller tax jurisdiction (See custom table containing country and national local currency codes).

(17) Invoice Amount After Tax (in Document Currency)—When Invoice category is 'X' for this validation, then:

Invoice Amount After tax (in Document Currency) is required to exist in SAP segment E2EDS01-011.

If it is not populated, reject invoice 14 with new error message (T100 Z0 message class):

'Invoice contains GST or VAT which requires invoice total amount quoted in & currency.'

Note: '&' is the document currency of invoice 14 [EDI_Z50-WAERK].

(18) Invoice Amount After Tax (in Local Currency)—When Invoice category is 'X' for this validation, then:

Invoice Amount After tax (in Local Currency) is required to exist in SAP segment E2EDS01-902 when invoice currency code < > purchasing country currency code.

If it is not populated, reject invoice 14 with new error message (T100 Z0 message class):

For transactions in categories 3, 5 & 6 (VAT registration number not on PO): '&' is the local currency of the purchasing country. (See table containing country and national local currency codes).

For transactions in categories 1, 2 & 4 (VAT registration number is on PO): '&' is the local currency of the seller tax jurisdiction (See table containing country and national local currency codes).

(19) [SupVATNbr] Seller VAT registration number—

When Invoice category is 'X' for this validation, then:

Seller VAT registration number is required to exist in SAP segment E2EDK02-BELNR-906.

If it is not populated, reject invoice 14 with new error message (T100 Z0 message class):

'Seller VAT Registration Number is required on Invoice'

(20) [PurVATNbr] Buying Company VAT registration number—

When Invoice category is 'X' for this validation, then:

Buying Company VAT registration number is required to exist in SAP segment E2EDK02-BELNR-909.

If it is not populated, reject invoice 14 with new error message (T100 Z0 message class):

'Buying Company VAT Registration Number is required on Invoice'

(21) [HUSupVAT] Seller domestic VAT registration number—

When Invoice category is 'X' for this validation, then:

Seller VAT registration number is required to exist in a second SAP segment E2EDK02-BELNR-906, but only when seller country is HU.

A) If it is not populated, reject invoice 14 with new error message (T100 Z0 message class):

'Seller Domestic VAT Registration Number is required on Invoice'

B) If it is populated, then also validate the format of this second VAT registration number against the allowable format in ZVATC.
1) if it does not follow the correct format, then reject invoice 14 with error message 153 (T100 Z0 message class):
'VAT Registration Number & is invalid' Please note '&' should correspond to the specific e2edk02-belnr with qualifier 906** that is incorrect.
(22) [taxPointDt] tax Point Date—
When Invoice category is 'X' for this validation, then:
Tax Point Date is required to exist in SAP segment E2EDK03-BELNR-015.
If it is not populated, reject invoice 14 with new error message (T100 Z0 message class):
'Tax Point Date is required on Invoice'
(23) 'Ship To' Company Name—When Invoice category is 'X' for this validation, then:
'Ship To' Company Name is required to exist in SAP segment E2EDKA1-NAME1 when E2EDKA1-PARRTN-PARVW is WE.
If it is not populated, reject invoice 14 with new error message (T100 Z0 message class):
'ShipTo' Company Name is required on Invoice'
(24) 'Ship To' Street Address—When Invoice category is 'X' for this validation, then:
'Ship To' Street Address is required to exist in SAP segment E2EDKA1-STRAS when E2EDKA1-PARRTN-PARVW is WE.
If it is not populated, reject invoice 14 with new error message (T100 Z0 message class):
"Ship To' Company Street Address is required on Invoice'
(25) 'Ship To' City—When Invoice category is 'X' for this validation, then:
'Ship To' City is required to exist in SAP segment E2EDKA1-ORT01 when E2EDKA1-PARRTN-PARVW is WE.
If it is not populated, reject invoice 14 with new error message (T100 Z0 message class): "Ship To' City is required on Invoice'
(26) 'Ship To' Country—When Invoice category is 'X' for this validation, then:
'Ship To' Country is required to exist in SAP segment E2EDKA1-LAND1 when E2EDKA1-PARRTN-PARVW is WE.
If it is not populated, reject invoice 14 with new error message (T100 Z0 message class): "Ship To' Country is required on Invoice'
(27) Vendor Fiscal Code (CIF/NIF Number)—When Invoice category is 'X' for this validation, then:
Vendor Fiscal Code (also called CIF/NIF Number) is required to exist in SAP segment E2EDK14 with qualifier of 'FC' for all Spanish vendors.
Spanish vendors are identified as follows:
A) Seller VAT Registration Number (E2EDK02-906) begins with ISO Country of 'ES'.
If it is not populated, reject invoice 14 with new error message (T100 Z0 message class): "Vendor Fiscal Code is required on Invoice'
(28) Invoice Issuing Location—When Invoice category is 'X' for this validation, then:
Invoice Issuing Location (City from which invoice is being presented) is required to exist in SAP segment E2EDK14 with qualifier of 'ADE' for all Spanish vendors.
Spanish vendors are identified as follows:
A) Seller VAT Registration Number (E2EDK02-906) on the begins with ISO Country of 'ES'.
If it is not populated, reject invoice 14 with new error message (T100 Z0 message class): 'Invoice Issuing Location is required on Invoice'
(29) Stock Registration Number—When Invoice category is 'X' for this validation, then:
Stock Registration Number (also called LITribunal) is required to exist in SAP segment E2EDK14 with qualifier of 'ZZZ' for all Italian and Spanish vendors.
Italian vendors are identified as follows:
A) Seller VAT Registration Number (E2EDK02-906) begins with ISO Country of 'IT'.
Spanish vendors are identified as follows:
A) Seller VAT Registration Number (E2EDK02-906) begins with ISO Country of 'ES'.
If it is not populated, reject invoice 14 with new error message (T100 Z0 message class): 'Stock Registration Number is required on Invoice'
(30) SIRET Number—When Invoice category is 'X' for this validation, then:
SIRET Number is required to exist in SAP segment E2EDK02 with qualifier of 'SIR' for all French vendors.
French vendors are identified as follows:
A) Seller VAT Registration Number (E2EDK02-906) begins with ISO Country of 'FR'.
If it is not populated, reject invoice 14 with new error message (T100 Z0 message class): 'SIRET Number is required on Invoice'
If it is populated, validate the format is correct. Field length must be 17 and in the format '123-123-123-12345' (all numeric).
If it is not the correct format, reject invoice 14 with new error message (T100 Z0 message class): 'SIRET Number & is invalid.'
(31) Capitale Sociale Number—When invoice category is 'X' for this validation, then:
Capitale Sociale number is required to exist in SAP segment E2EDK14 with qualifier of 'ADE' for all Italian vendors.
Italian vendors are identified as follows:
A) Seller VAT Registration Number (E2EDK02-906) begins with ISO Country of 'IT'.
If it is not populated, reject invoice 14 with new error message (T100 Z0 message class): 'Capitale Sociale Number is required on Invoice'
(32) [LegalArtNb] Legal Article Number—
When Invoice category is 'X' for this validation, then:
(1) Legal Article Number is required to exist in SAP segment E2EDPT2-TDLINE with E2EDPT1-TDID of 'TXD' <Reference WOI CR5-00007> for zero rated invoices when invoice 14 tax jurisdiction and Purchasing country combination exist in new custom table below.
If it is not populated, reject invoice 14 with new error message (T100 Z0 message class): "Legal Article Number is mandatory for zero rated VAT Invoice.'
(2) Identify that valid Legal Article number was provided: Compare the text in the E2EDPT2-TDLINE (strip spaces and special characters out) to the new custom table which holds all valid Legal Article numbers based on Company Code and tax jurisdiction For the matching tax jurisdiction and Purchasing Country in the new custom table, If there is a match to any of the entries (strip out spaces and special characters for the compare), then a valid Legal Article Number has been provided.
For the matching tax jurisdiction and Purchasing Country in the new custom table, If there is not a matching legal article number, then a valid Legal Article Number has not been provided and invoice 14 will be rejected with new error message (T100 Z0 message class): 'Legal Article Number & is not valid.'

II. Computerized Implementation

Referring now to FIG. 8, a more detailed diagram of a computerized implementation 100 of the present invention is shown. As depicted, implementation 100 includes a computer system 104 deployed within a computer implementation 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer implementation 102 is intended to demonstrate that some or all of the components of implementation 100 could be deployed, managed, serviced, etc. by a service provider who offers to validate invoices according to the present invention. In a typical embodiment computer system 104 is part of or works in conjunction with computer infrastructure of a content deliver service(s).

As shown, computer system 104 includes a processing unit 106, a memory 108, a bus 110, and input/output (I/O) interfaces 112. Further, computer system 104 is shown in communication with external I/O devices/resources 114 and storage system 116. In general, processing unit 106 executes computer program code, such as invoice processing system 12, which is stored in memory 108 and/or storage system 116. While executing computer program code, processing unit 106 can read and/or write data to/from memory 108, storage system 116, and/or I/O interfaces 112. Bus 110 provides a communication link between each of the components in computer system 104. External interfaces 114 can comprise any devices (e.g., keyboard, pointing device, display, etc.) that enable a user to interact with computer system 104 and/or any devices (e.g., network card, modem, etc.) that enable computer system 104 to communicate with one or more other computing devices.

Computerized implementation 102 is only illustrative of various types of computer infrastructures for implementing the invention. For example, in one embodiment, computer implementation 102 comprises two or more computing devices (e.g., a server cluster) that communicate over a network to perform the various process steps of the invention. Moreover, computer system 104 is only representative of various possible computer systems that can include numerous combinations of hardware. To this extent, in other embodiments, computer system 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations, e.g., on a client and server. Similarly, memory 108 and/or storage system 116 can comprise any combination of various types of data storage and/or transmission media that reside at one or more physical locations. Further, 110 interfaces 112 can comprise any system for exchanging information with one or more external interfaces 114. Still further, it is understood that one or more additional components (e.g., system software, math co-processing unit, etc.) not shown in FIG. 8 can be included in computer system 104. However, if computer system 104 comprises a handheld device or the like, it is understood that one or more external interfaces 114 (e.g., a display) and/or storage system 116 could be contained within computer system 104, not externally as shown.

Storage system 116 can be any type of system (e.g., a database) capable of providing storage for information under the present invention such as electronic invoices, electronic purchase orders, sets of rules, computations/determinations made by invoice processing system 12, etc. To this extent, storage system 116 could include one or more storage devices, such as a magnetic disk drive or an optical disk drive. In another embodiment, storage system 116 includes data distributed across, for example, a local area network (LAN), wide area network (WAN) or a storage area network (SAN) (not shown). In addition, although not shown, additional components, such as cache memory, communication systems, system software, etc., may be incorporated into computer system 104.

Shown in memory 108 of computer system 104 is invoice processing system 12, which includes a document reception system 120, a jurisdiction determination system 122, a category determination system 124, a validation system 126, and an invoice determination system 128. These systems perform the functions of the present invention as discussed above. Before, their functions are discussed in greater detail, it should be understood that invoice processing system 12 can be implemented as part of a SAP system or in conjunction with a SAP system (not shown). In addition, it should be understood that the configuration of invoice processing system 12 is intended to be illustrative only and that the same functionality could be achieved with an different configuration than is shown in FIG. 8.

In any event, assume that a transaction is occurring between purchaser 142A in jurisdiction "A" (purchaser tax jurisdiction 140A) and seller 142B in jurisdiction "B" (seller tax jurisdiction 140B). In general, the transaction will result in a purchase order 146 and an invoice 144 that are electronically received by document reception system 120. Upon receipt, jurisdiction determination system 122 will examine invoice 146, purchase order 144, or both to determine purchaser tax jurisdiction 140A and seller tax jurisdiction 140B. Specifically, jurisdiction determination system 122 will examine the seller VAT registration number on invoice 144 and the purchaser VAT registration number on invoice 144 or purchase order 146 (e.g., as stored in a header or item of purchase order 146) and extract the respective country code prefixes to identify the respective jurisdictions 140A-B.

Once purchaser tax jurisdiction 140A and seller tax jurisdiction 140B have been determined, category determination system 124 will apply a set of categorization rules thereto to determine a category of invoice 144 (e.g., using a best fit of the information to the set of categorization rules). Then, using this category and a set of validation rules, validation system 126 will validate invoice 144. Specifically, validation system 126 will determine a corresponding tax code and determine whether the (e.g., VAT) tax rate on invoice 144 is correct. In addition, validation system 126 can perform other validations such as analyzing invoice 144 to determine whether all required information is present. In any event, based on the validation process, invoice determination system 128 will determine whether invoice 144 is valid as a whole, and output the final determination 20. In general, invoice 144 is valid if it passes all validations, and is invalid if it fails one of the validations.

While shown and described herein as a method and system for electronically validating invoices, it is understood that the invention further provides various alternative embodiments. For example, in one embodiment, the invention provides a computer-readable/useable medium that includes computer program code to enable a computer infrastructure to electronically validate invoices. To this extent, the computer-readable/useable medium includes program code that implements each of the various process steps of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 108 (FIG. 8) and/or storage system 116 (FIG. 8) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process steps of the invention on a subscription, advertising, and/or fee basis. That is, a service provider, such as a Solution Integrator, could offer to electronically validate invoices. In this case, the service provider can create, maintain, support, etc., a computer infrastructure, such as computer implementation 102 (FIG. 8) that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for electronically validating invoices. In this case, a computer infrastructure, such as computer implementation 102 (FIG. 8), can be provided and one or more systems for performing the process steps of the invention can be obtained (e.g., created, purchased, used, modified, etc.) and deployed to the computer infrastructure. To this extent, the deployment of a system can comprise one or more of (1) installing program code on a computing device, such as computer system 104 (FIG. 8), from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for electronically validating invoices, comprising:
   electronically receiving an invoice corresponding to a transaction between a purchaser and a seller;
   determining a purchaser tax jurisdiction for the transaction from a tax registration number that is unique to the purchaser and a seller tax jurisdiction for the transaction from a tax registration number that is unique to the seller;
   determining, using a computer device, a category of the transaction based on the purchaser tax jurisdiction, the seller tax jurisdiction, and a set of categorization rules, the category of the transaction defining a relationship between the purchaser and seller tax jurisdictions;
   validating a tax rate indicated on the invoice based on the category and a set of validation rules; and
   determining whether the invoice is valid based on the validating.

2. The method of claim 1, wherein the purchaser tax jurisdiction is different than the seller tax jurisdiction, and wherein the purchaser tax jurisdiction is a first country and the seller tax jurisdiction is a second country.

3. The method of claim 1, wherein the purchaser tax jurisdiction and the receiving tax jurisdiction are determined from tax registration numbers indicated on the invoice, each of the tax registration numbers being assigned by a respective tax jurisdiction.

4. The method of claim 1, wherein the purchaser tax jurisdiction is determined from the tax registration number of the purchaser on a purchase order corresponding to the transaction, the tax registration number of the purchaser being one of a plurality of tax registration numbers that are unique to the purchaser.

5. The method of claim 1, further comprising determining a tax code for the transaction, wherein the validating is further based on the tax code.

6. The method of claim 1, wherein the invoice is received in an invoice processing system that automatically determines whether the invoice is valid.

7. The method of claim 1, wherein the validating further comprises determining whether the invoice contains all required information.

8. The method of claim 1, wherein the tax rate is a value added tax (VAT) rate.

9. A system for electronically validating invoices, comprising:
   a document reception system for electronically receiving an invoice corresponding to a transaction between a purchaser and a seller;
   a jurisdiction determination system for determining a purchaser tax jurisdiction for the transaction from a tax registration number that is unique to the purchaser and a seller tax jurisdiction for the transaction from a tax registration number that is unique to the seller, wherein the purchaser tax jurisdiction is different than the seller tax jurisdiction;
   a category determination system for determining a category of the transaction based on the purchaser tax jurisdiction, the seller tax jurisdiction, and a set of categorization rules, the category of the transaction defining a relationship between the purchaser and seller tax jurisdictions;

a validation system for validating a tax rate indicated on the invoice based on the category and a set of validation rules; and an invoice determination system for determining whether the invoice is valid based on a result of the validation system.

10. The system of claim 9, the purchaser tax jurisdiction and the receiving tax jurisdiction are determined from tax registration numbers indicated on the invoice, each of the tax registration numbers being assigned by a respective tax jurisdiction.

11. The system of claim 9, wherein the purchaser tax jurisdiction is determined from the tax registration number of the purchaser on a purchase order corresponding to the transaction, the tax registration number of the purchaser being one of a plurality of tax registration numbers that are unique to the purchaser.

12. The system of claim 9, wherein the validation system further determines a tax code for the transaction, and wherein the validating is further based on the tax code.

13. The system of claim 9, wherein the set of categorization rules and the set of validation rules are stored in a set of tables.

14. The system of claim 9, wherein the validation system further determines whether the invoice contains all required information.

15. The system of claim 9, wherein the tax rate is a value added tax (VAT) rate.

16. A program product stored on a computer readable medium for electronically validating invoices, the computer readable medium comprising program code for causing a computer system to perform the following steps:

electronically receiving an invoice corresponding to a transaction between a purchaser and a seller;

determining a purchaser tax jurisdiction for the transaction from a tax registration number that is unique to the purchaser and a seller tax jurisdiction for the transaction from a tax registration number that is unique to the seller;

determining a category of the transaction based on the purchaser tax jurisdiction, the seller tax jurisdiction, and a set of categorization rules, the category of the transaction defining a relationship between the purchaser and seller tax jurisdictions;

validating a tax rate indicated on the invoice based on the category and a set of validation rules; and determining whether the invoice is valid based on the validating.

17. The program product of claim 16, the purchaser tax jurisdiction and the receiving tax jurisdiction are determined from tax registration numbers indicated on the invoice, each of the tax registration numbers being assigned by a respective tax jurisdiction.

18. The program product of claim 16, wherein the purchaser tax jurisdiction is determined from the tax registration number of the purchaser on a purchase order corresponding to the transaction, the tax registration number of the purchaser being one of a plurality of tax registration numbers that are unique to the purchaser.

19. The program product of claim 16, wherein the computer readable medium further comprises program code for causing the computer system to perform the following step: determining a tax code for the transaction, wherein the validating is further based on the tax code.

20. The program product of claim 16, wherein the set of categorization rules and the set of validation rules are stored in a set of tables.

21. The program product of claim 16, wherein the invoice is received in an invoice processing system that automatically determines whether the invoice is valid.

22. The program product of claim 16, wherein the computer readable medium further comprises program code for causing the computer system to perform the following step: determining whether the invoice contains all required information.

23. The program product of claim 16, wherein the tax is a value added tax (VAT) rate.

24. A method for deploying an application for electronically validating invoices, comprising:

providing a computer infrastructure that includes a computer device, the computer infrastructure being operable to:

electronically receive an invoice corresponding to a transaction between a purchaser and a seller;

determine a purchaser tax jurisdiction for the transaction from a tax registration number that is unique to the purchaser and a seller tax jurisdiction for the transaction from a tax registration number that is unique to the seller;

determine a category of the transaction based on the purchaser tax jurisdiction, the seller tax jurisdiction, and a set of categorization rules, the category of the transaction defining a relationship between the purchaser and seller tax jurisdictions;

validate a tax rate indicated on the invoice based on the category and a set of validation rules; and determine whether the invoice is valid based on the validating.

* * * * *